United States Patent Office 2,829,054
Patented Apr. 1, 1958

2,829,054

METHOD OF ENRICHING FOOD PRODUCTS AND THE RESULTING PRODUCT

Wolffe H. Feinstone, Indianapolis, Ind.

No Drawing. Application June 9, 1955
Serial No. 514,391

5 Claims. (Cl. 99—11)

This invention relates to the coating of food products. It has particular application to the fortification or enrichment of cereal grains and grain products such as rice, hominy, hominy grits, barley and the like, but it is in no way limited to those materials.

Cereal grains and grain products are the staples of diet in most of the areas of the world. In preparing cereal grains for consumption, they are usually hulled and milled. The milling process in common use removes most of the vitamin and mineral constituents of the natural grains. At the same time, the consuming public has been so conditioned to the appearance of the grains which are processed in the conventional manner, that the public rejects grains which do not have that particular appearance. The public has further been conditioned to the limitations of the process of the prior art. Thus, for example, it is the universal practice to wash milled rice prior to cooking.

The problem of trying to fortify such products has been apparent to millers and nutritional health authorities for many years. Various methods for adding vitamins and minerals to these products or of retaining the naturally occurring vitamins and minerals have been tried, and some of them are in use. Each of the methods used heretofore, however, has had certain disadvantages which makes it less effective than is desired. For example, rice has been subjected to a parboiling or conversion procedure which does help to retain some of the vitamin and mineral elements in the finally milled rice. However, the quantities of the nutritional elements so retained are usually below the accepted minimal standards and the grains are altered in color and appearance, so that uninformed consumers tend to reject them.

In recent years, heavily fortified grains of rice have been intermixed with unfortified grains in the ratio of one heavily fortified grain to 200 to 800 unfortified grains. It can be seen that the success of this method, from the viewpoint of public health, is dependent upon the uniformity of the ultimate mixture of fortified and unfortified grains, both in the bulk mixing at the processing plant and in the random sampling which the consumer in effect makes when he uses the grain for cooking. Such uniformity is difficultly accomplished if it is ever done. Furthermore, the treated grains are so heavily fortified that they have a distinctively different and foreign appearance, which, in practice, leads the very persons who most need the vitamins and minerals to remove as many of the foreign looking grains as can be found. Still another objection to this process, which is known as a "pre-mix" process, lies in the fact that the preparation of the fortified grains is most economically carried out in a central plant, which in turn supplies the fortified grain to various millers and packers of grains over a wide area, because it is not economically feasible for each miller and packer to process its own pre-mix. With a central plant supplying the enriched grains, it is often difficult to match the type of fortified grains with the particular size and grade of the grains with which it will be mixed.

One of the objects of this invention is to provide a process for coating food products, which process is capable of producing an inconspicuous coating, which coating is substantially water insoluble, non-toxic, physiologically inert, compatible with vitamins, minerals, coloring, flavoring and nutrient substances so that such substances may be incorporated in the coating, and which adheres tenaciously to the food to which it is applied.

Another object is to provide such a process which is cheap, simple, and rapid.

Still another object is to provide food products coated with a substantially water-insoluble film containing one or more vitamin, mineral, coloring, flavoring or nutrient substances, which film is stable, and the film-forming portion of which is physiologically inert and inconspicuous.

Other objects will become apparent to those skilled in the art in the light of the following description.

In accordance with this invention, generally stated, a food, generally a particulate or granular food, is coated with an aqueous dispersion of a film-forming substance and the film-forming substance is then rendered substantially water-insoluble. The term "dispersion" is used herein to include molecular dispersions (solutions), colloidal dispersions, and particulate or mechanical dispersions.

Various nutrient, mineral, vitamin, flavoring or coloring substances may be incorporated in the aqueous dispersion, and these substances will be firmly bound to the food product by the water-insoluble coating which is produced in place when the film-forming substance is rendered water-insoluble. As used herein, the term "water-insoluble" indicates that the film will withstand the normal washing to which the foods to which it is applied are subjected.

The film-forming material and its accompanying substances may be applied to the food in any suitable way, as by dipping or spraying.

A film-forming substance which is particularly adapted to this purpose is the free acid of carboxymethylcellulose. This material has the property of forming a colloidal dispersion in water under certain circumstances, but of becoming water-insoluble when dried to a water content of less than 15%. It produces an excellent clear film. Water dispersions of this material are readily produced from commercially available sodium carboxymethylcellulose, by ion exchange. The process is described in an article entitled "Carboxymethylcellulose in the free acid form," by Dieckman, Jarrell and Voris, 45, Industrial And Engineering Chemistry, No. 10, page 2287. The free acid of carboxymethylcellulose, hereafter abbreviated as HCMC, is not only readily prepared but its water dispersion is somewhat acidic, having a pH of about 3. This is especially desirable when vitamins are to be added to the dispersion, since the vitamin elements are themselves acidic when dissolved in water and are more stable when in such an environment. Carboxymethylcellulose has been found acceptable as an ingredient in many foods such as icings for pastries, salad dressings, frozen desserts, ice cream, pie fillings and the like, in certain products such as tooth pastes and in some internally administered medicines; in all of which the quantities ingested are many times those which would be consumed in the course of eating grains and grain products coated in accordance with this invention.

In the following examples of the process and product of this invention, the HCMC is used as the sole film-forming agent. However, other film-forming agents may be employed. Numerous variations in the means of carrying out the process, in the additives employed, and in the products which may be treated will also occur to those skilled in the art.

*Example I*

A water dispersion of HCMC is prepared as follows: 20 grams of sodium carboxymethylcellulose (sodium CMC) extra low viscosity (approximately 20 cp. at 25° C., 2% water solution) is dissolved in a quantity of de-ionized water to make one-thousand cc. of 2% sodium CMC. This solution is passed through a column packed with a cation exchange resin. A nuclearly sulfonated styrene-divinylbenzene copolymer such as Amberlite IR-120 or Permutit Q may be used as the resin. In actual practice, Dowex 50X8 (a 200–400 mesh synthetic cation exchange resin containing nuclear sulfonic acid groups attached to a styrene-divinylbenzene matrix, the copolymer containing 8% divinylbenzene, produced by Dow Chemical Co.) which has previously been charged to the acid form, has been used. The resin column is of sufficient capacity to effect practically complete exchange of all the sodium ions of the sodium CMC for hydrogen ions from the resin. In the present example, the column used may be 20 mm. in diameter and 60 cm. high, with a volume of settled resin 40 cm. high. The solution of sodium CMC may be passed through the column by upward flow. The resulting water dispersion contains approximately 2% HCMC. Different viscosity grades of sodium CMC, such as Premium Low, Low, or even Medium or High may also be used, although in using the higher viscosity materials, it is difficult to obtain a readily flowable solution that contains adequate quantities of HCMC for film formation. The water used to make up the solution may be distilled water or potable tap water, and the solution of sodium CMC may be of greater or lesser concentration than that indicated. The concentration used will to some extent depend upon the viscosity of the solution, since the solution must flow through the column.

When the water dispersion of HCMC is prepared, a water dispersion of vitamin and mineral constituents is prepared which contains:

Thiamine mononitrate (or other salt) _____mg__ 50
Niacin _____mg__ 360
Ferrous sulfate.7H$_2$O _____grams__ 1.5
Distilled water q. s. ad_____cc__ 30

To the 30 cc. of vitamin and mineral dispersion is added 10 cc. of the HCMC dispersion, and the two are thoroughly mixed. This formulation has a final concentration of 0.5% of HCMC. The resultant mixture is sprayed onto milled rice grains with an atomizer at the rate of 2 cc. of dispersion per pound of rice. The rice is then dried rapidly in a stream of moving air at about 30°–35° C. Drying is best accomplished when the rice is kept agitated by vibration or other means. When the rice is agitated, the air need not necessarily be warmed.

It will be found that the rice thus treated has been coated with an inconspicuous film which is substantially water-insoluble, which adheres tenaciously, and which contains the vitamins and mineral which were present in the original dispersion. The film and the rice coated therewith are stable in storage, and the film resists washing off, beyond accepted tolerances for the fortifying ingredients. The rice behaves indistinguishably from untreated rice in cooking.

The rice so prepared contains an excess over the required 16 mg. niacin, 13 mg. iron, 2 mg. thiamin per pound of rice. The excesses are incorporated to compensate for inaccuracies in degree of application of the spray, unavoidable losses, and the like, as is common practice.

*Example II*

Dispersions are prepared in the same manner as in Example I, but the HCMC and the vitamin and mineral dispersions are mixed in the proportions of 1 to 1, yielding a final concentration of 1% HCMC. Rice is treated in the same manner as in Example I. This treatment, while doubling the amount of vitamins and mineral on the rice, does not noticeably affect the appearance of the rice nor its keeping property.

*Example III*

(*a*) Aqueous dispersion of HCMC prepared in the same manner as in Example I.

(*b*) An aqueous dispersion of vitamins and minerals as follows:

Thiamine hydrochloride _____mg__ 50
Niacin _____mg__ 360
Ferric pyrophosphate _____grams__ 2.5
Sodium benzoate _____mg__ 30
Distilled water q. s. ad_____cc__ 30

The dispersions (*a*) and (*b*) are mixed as in Example I and rice is treated in the manner there set out. The sodium benzoate acts to preserve against mold growth during prolonged storage of the material under humid conditions.

*Example IV*

(*a*) Aqueous dispersions of HCMC prepared in the same manner as in Example I.

(*b*) Aqueous dispersion of vitamins and mineral as follows:

Thiamine mononitrate (or other salt) _____mg__ 50
Niacin _____mg__ 360
Ferrous sulfate.7H$_2$O (or other soluble iron salt in
    equiv. amt.)_____grams__ 1.5
Riboflavin _____mg__ 50
Distilled water q. s. ad_____cc__ 30

The dispersions (*a*) and (*b*) are mixed as in Example I, and rice treated in the manner there set out. Rice treated with the mixed dispersions emerges from the treatment with a pleasing golden color characteristic of riboflavin.

*Example V*

Aqueous dispersion of HCMC prepared in the same manner as in Example I, to which 250 cc. of sorbitol is added. The remainder of the process is the same as in Example I.

The sorbitol acts as a plasticizer for the film. Glycerin, propylene glycol or any other suitable non-toxic plasticizer may be used. The use of a plasticizer simply renders the coating less brittle and likely to be chipped off or to check.

*Example VI*

(*a*) Aqueous dispersion of HCMC prepared in the same manner as in Example I.

(*b*) An aqueous dispersion of vitamins as follows:

Thiamine mononitrate _____mg__ 5
Niacin _____mg__ 36
Ferrous sulfate_____mg__ 150
Deionized water_____cc__ 150

150 cc. of the vitamin dispersion are mixed with 50 cc. of the 2% HCMC dispersion. 100 grams of rice are submerged in the mixed dispersions and quickly dried as free of the liquid as possible with the aid of suction on a filter pad. The rice is then dried in warm flowing air, preferably while the grains are agitated.

The coating solution in this example is more dilute than that in Example I because a heavier coating results from the dipping or complete submerging method than from the spraying method described in Example I.

Example VII

Same as Example I but employing corn grits in place of milled rice.

Example VIII

Same as Example I but employing hominy grits in place of milled rice.

Example IX

Same as Example I but employing converted rice.

Example X

Same as Example I but employing corn flakes in place of milled rice.

Example XI

Same as Example I but employing puffed wheat in place of milled rice.

Example XII

Same as Example I but employing milled barley in place of milled rice.

Example XIII

Same as Example I but employing oat cereal, e. g. "Cheerios," in place of rice.

Example XIV (a) Aqueous dispersion of HCMC prepared as in Example I.

(b) Aqueous dispersion of flavoring and nutrient substances as follows:

| | |
|---|---|
| Condensed chicken broth concentrated 3 times by evaporation of water_____cc__ | 20 |
| Monosodium glutamate_____grams__ | 3.0 |
| Table salt_____do____ | 1.0 |
| Potable tap water_____cc__ | 10 |

Dispersions (a) and (b) are mixed in the ratio of 1 to 1. The mixed dispersions are sprayed on milled rice at the rate of 2 cc. of mixture per pound of rice. The rice is dried as in Example I. Rice treated in this manner and cooked in salted water has a distinctively delicious chicken flavor.

Example XV (a) Aqueous dispersion of HCMC prepared as in Example I.

(b) Nutrient and flavoring dispersion (b) of Example XIV.

(c) Fortifying dispersion (b) of vitamins and iron salt of Example IV.

Combine and mix two parts (a) with 1 part (b) and 1 part (c). Spray and dry rice as in Example I. This rice, cooked in salted water has an attractive golden color and delicious flavor.

The foregoing examples are, as has been pointed out, merely illustrative. The dispersions of coating agent and additives may be applied to particulate foods in the form of a fine mist through which the particles may be made to fall. The grains, kernels, chips, flakes, or whatever the particulate form may be, may be coated in this manner on all sides simultaneously. They may also be sprayed while on a conveyor belt where they may be agitated to permit the spray thoroughly to coat them. Spraying in general is considered preferable to dipping and draining because the spraying avoids complete wetting of the particles, requires a minimum of drying, and may easily be adapted to common commercial processes. Thorough wetting of such grains as rice may cause, upon drying, a brittleness or checking of the grains. This may be avoided to some extent by the use of plasticizers as was set out in Example V, as well as by careful application of the filming agent.

In the foregoing example, drying of the coatings has been described as being accomplished with currents of warm air. Many coatings and their contents may be dried by a brief exposure to a relatively high heat without harm to the coating and contents. The coating of Example I, for instance, may be dried by permitting the rice to fall through a short vertical flue through which a vigorous draft of air at 300° C. is passing. The rice is exposed to the heat for only a second or two, but the coating becomes quite dry. A simple apparatus in the form of a vertical tube through which food particles fall, being sprayed at the upper end of the tube and dried as they travel to the lower end of the tube, suggests itself, and such an apparatus has been found satisfactory. Other means of drying will also suggest themselves to those skilled in the art.

Vegetable dyes, trace elements, various flavorings, and innumerable other additives may be used.

While the coatings of the invention may be made inconspicuous, they may also be made deliberately conspicuous. For example, in producing flavored rice, it may be either necessary or desirable or both, to make the rice appear distinctive as by giving it a "salt and pepper" look, or coloring it. Breakfast cereals and the like may be colored for sales appeal. Similarly, while the coatings of the invention are resistant to washing, it may be desirable to use flavoring or other additives which perform best when the rice is left unwashed.

In a sense such film forming agents as HCMC are water-insoluble even though they are in the form of a colloidal dispersion in water. When such a coating is spoken of herein as being rendered water-insoluble, the expression is used to mean that the coating is converted to a form which will not redissolve or redisperse in plain water, i. e., which will withstand the normal washing to which the foods to which it is applied may be subjected.

Having thus described the invention, what is claimed and desired to be secured by Letters Patent is:

1. The process of treating food comprising preparing an aqueous dispersion of the free acid of carboxymethylcellulose and an additive material, wetting the surface of said food with the dispersion, and drying the wet surface to from a film of free acid of carboxymethylcellulose and render it substantially water-insoluble and to bind the additive material to the food.

2. The process of enriching cereal grains comprising preparing an aqueous dispersion of the free acid of carboxymethylcellulose and of vitamin substances, wetting the surface of said grains with said dispersion, and drying the wet surface to form a film of free acid of carboxymethylcellulose and render it substantially water-insoluble and to bind the vitamin substances to said grains.

3. The process of treating cereal grains comprising preparing an aqueous dispersion of the free acid of carboxymethylcellulose and flavoring substances, wetting the surface of said grains with said dispersion, and drying the wet surface to form a film of free acid of carboxymethylcellulose and render it substantially water-insoluble and to bind the flavoring substances to said grains.

4. Food coated with a substantially water-insoluble film consisting essentially of the free acid of carboxymethylcellulose and a water dispersible fortificant.

5. Food coated with a substantially water-insoluble film consisting essentially of the free acid of carboxymethylcellulose and a water dispersible fortificant including ferrous sulfate.

References Cited in the file of this patent

UNITED STATES PATENTS

| | | |
|---|---|---|
| 2,381,343 | Furter | Aug. 7, 1945 |
| 2,475,133 | Furter | July 5, 1949 |
| 2,665,992 | Naps | Jan. 12, 1954 |
| 2,712,499 | Pierre | July 5, 1955 |